United States Patent [19]

Christensen

[11] 3,886,520

[45] May 27, 1975

[54] CHECKING CIRCUIT FOR A 1-OUT-OF-N DECODER

[75] Inventor: Bruce A. Christensen, Minneapolis, Minn.

[73] Assignee: Sperry Rand Corporation, New York, N.Y.

[22] Filed: Apr. 3, 1974

[21] Appl. No.: 457,669

[52] U.S. Cl. .................................... 340/146.1 AB

[51] Int. Cl. ...................... G06t 11/08; H03k 13/34

[58] Field of Search ...... 340/146.1 AB; 235/153 BG

[56] References Cited

UNITED STATES PATENTS

| | | | |
|---|---|---|---|
| 3,541,507 | 11/1970 | Duke | 340/146.1 AB |
| 3,559,167 | 1/1971 | Carter et al. | 235/153 BG |
| 3,559,168 | 1/1971 | Carter et al. | 340/146.1 AB |
| 3,602,886 | 8/1971 | Carter | 235/153 BG |
| 3,634,665 | 1/1972 | Carter | 235/153 BG |
| 3,779,458 | 12/1973 | Yu-Pang Chang et al. | 235/153 BG |
| 3,784,977 | 1/1974 | Carter et al. | 340/146.1 AB |
| 3,784,978 | 1/1974 | Zola | 340/146.1 AB |
| 3,825,894 | 7/1974 | Johnson | 235/153 BG |

OTHER PUBLICATIONS

Boudeile, One Out of N Detector, IBM Technical Disclosure Bulletin, Vol. 13, No. 6, Nov. 1970, pp. 1490–1491.

Sellers et al., Error Detecting Logic for Digital Computers, McGraw-Hill, 1968, pp. 212–217.

*Primary Examiner*—Charles E. Atkinson
*Attorney, Agent, or Firm*—Kenneth T. Grace; Thomas J. Nikolai; Marshall M. Truex

[57] ABSTRACT

A checking circuit for a 1-out-of-*n* decoder and a method of the designing thereof is disclosed. The method involves generating a binary table of n rows, 0 through *n*-1, each row comprising a set of K, 0 or 1, entries, and K columns, 0 through K-1, with a 0 or a 1 entry at each row-column intersection. Associating each of the n sets of entries with an associated one of the *n* outputs of the decoder, the 0 entries and the 1 entries of each column are coupled to separate pairs of column-associated 0-OR gates and 1-OR gates, respectively. The output of each of the pairs of column-associated OR gates are then coupled to a separate column-associated AND gate, the outputs of which are coupled to a >1-OR gate for indicating that two or more of the decoder outputs are active. The outputs of a pair of column-associated OR gates are coupled to a <1-OR gate for indicating that none of the decoder outputs is active.

3 Claims, 5 Drawing Figures

CHECKING CIRCUIT FOR A 1-OUT-OF-N DECODER

BACKGROUND OF THE INVENTION

In the prior art, checking circuits have split the 1-out-of-$n$ decoder outputs into odd and even groups to look for no lines active or two or more lines active. For any value of $n$, there are certain stuck-at-one faults that remain undetected, as shown by Carter, et al., IEEE Transactions on Computers, November, 1971, pages 1413 – 1414. Other Publications such as the Carter, et al., U.S. Pat. No. 3,559,168 and Anderson, et al., IEEE Transactions On Computers March, 1973, pages 263 – 269, have attempted to design totally self-checking check circuits for $m$-out-of-$n$ codes. The present invention is considered to be an improvement over that of the above-noted prior art publications, such as that of the Anderson, et al., publication, whereby there is provided a checking circuit for a 1-out-of-$n$ decoder utilizing the minimum number of logic circuits providing the minimum circuit delays.

SUMMARY OF THE INVENTION

In the present invention there is provided a method of designing a checking circuit for a 1-out-of-$n$ binary decoder where $n = 2^K$, $n$ being the number of binary inputs, 0 or 1, that are to be checked and K being a positive integer of 2 or greater. The method comprises the steps of:

generating a binary table of $n$ rows, 0 through $n$-1, each row comprising a set of K, 0 or 1, entries, and K columns, 0 through K-1, a 0 or 1 entry being at each row-column intersection;

coupling each of the $n$ decoder outputs 0 through $n$-1 to all the K entries of each associated set of entries;

coupling all the 0 entries of each column as separate inputs to a separate column-associated 0-OR gate;

coupling all the 1 entries of each column as separate inputs to a separate column-associated 1-OR gate;

coupling the outputs of the 0-OR gate and of the 1-OR gate of only one column to a <1-OR gate for generating the <1 output signal indicating that none of the n decoder outputs is active;

coupling the outputs of the 0-OR gate and of the 1-OR gate of each column as separate inputs to a separate one of K column-associated AND gates;

coupling the outputs of the K column-associated AND gates as separate inputs to a >1-OR gate for generating the >1 output signal indicating that two or more of the $n$ decoder outputs are active. Also disclosed is a method of designing a checking circuit for a 1-out-of-$m$ binary decoder where $m<n = 2^K$, $m$ being the number of binary inputs 0 or 1 that are to be checked and K being a positive integer of 2 or greater.

DESCRIPTION OF THE PREFERRED EMBODIMENTS

Figure 1:
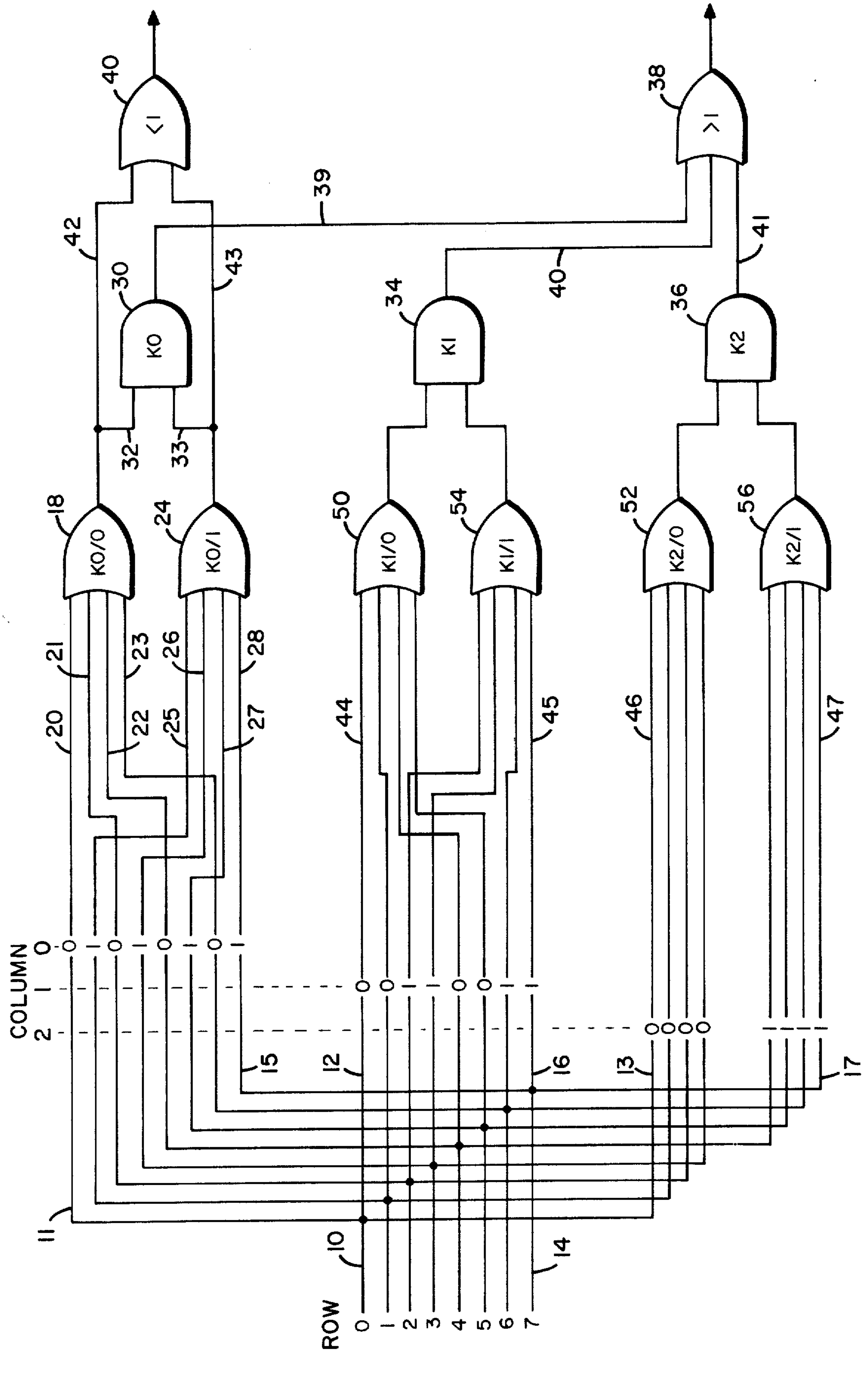
FIG. 1 is a diagrammatic illustration of the practice of the method of the present invention in designing a 1-out-of-8 checking circuit.

Prior art 1-out-of-n checking circuits have had their outputs split into odd and even groups and have attempted to detect for no line active or for more than one line active. For any value of n there have been certain stuck-at-one faults that remained undetected as noted by the above discussed Carter, et al, publication. In the present invention to eliminate the stuck-at-one faults, the hardware requirements as taught by the above discussed Anderson, et al., publication are minimized by a straight forward technique employing the generation of a binary table that is of a sufficient size to accommodate the n output lines of the 1-out-of-$n$ decoder that is to be checked by the checking circuit. That is, the binary table is of the form $n = 2^K$ where $n$ is the number of binary inputs, 0 or 1, from the decoder to the checking circuit, and K is a positive integer of 2 or greater. The binary table is formed of $n$ rows 0 through $n$-1, each row comprising a set of K, 0 or 1, entries and K columns 0 through K-1, with a 0 or 1 at each row-column intersection. Table A is an example of a binary table where $n$ = 8 and $K$ = 3 while Table B is an example of a binary table where $n$ = 16 and $K$ = 4.

If a 1-out-of-$m$ checking circuit is desired, where $m$ $2^K$, then the same binary table $n = 2^K$ is constructed as before; however, $m$ contiguous sets of entries from the substantial center of the table are selected for construction of the checking circuit. This procedure ensures that each of the separate column-associated OR gates has substantially the same number of inputs. As an example, in Table A to construct a checking circuit where $m$ $n = 2^K$ where $m$ = 6 and $n$ = 8, the 1-out-of-$m$ decoder inputs are coupled to the $m$ sets of entries of $n$1 through $n$6. This ensures that each of the 0-OR gates and the 1-OR gates associated with each of the columns K2, K1, K0 has three inputs. Note that because of the end-around symmetry of a binary table the $m$ sets of entries $n$0 – $n$2, $n$5 – $n$7 would likewise provide column-associated OR gates of like numbers of inputs, and, accordingly, such sets of entries are also considered as being from the substantial center of the table.

TABLE A
n = 8
K = 3
m = 6

$2^K$

| | 2 | 1 | 0 |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

n — m — COLUMNS — ROWS

TABLE B $n = 16$ $K = 4$ $m = 10$

| $2^K$ | 3 | 2 | 1 | 0 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

n (rows 0 through 15); m (rows 3 through 12)

Figure 2:
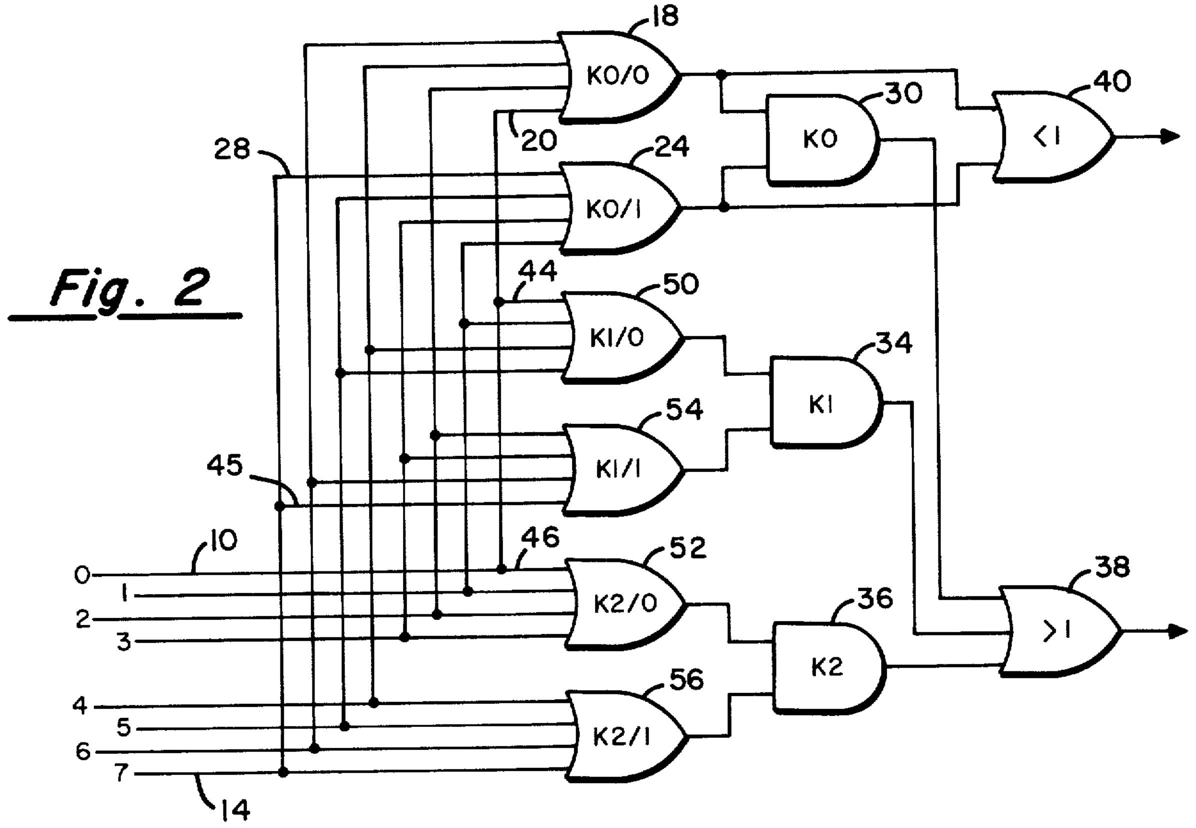
FIG. 2 is a circuit diagram of the 1-out-of-8 checking circuit of FIG. 1.

With particular reference to FIG. 1 there is illustrated the manner in which a checking circuit for a 1-out-of-8 decoder, as illustrated in FIG. 2, is generated using the binary table of Table A. Assuming $n$, the number of outputs of the decoder to be checked, to be 8 then given $n = 2^K$, $n = 8$, $K = 3$.

The Table A is then generated having $n$ rows, 0 through 7, and K columns, 0 through 2.

Next, the n decoder outputs 0 through 7 are each coupled in parallel to the associated, or set of, entries of the associated row. As an example, decoder output 0 at line 10 is coupled in parallel to the entries 0, 0, 0 of columns K2, K1, K0 by means of lines 13, 12, 11, respectively, while decoder output 7 at line 14 is coupled to the entries 1, 1, 1, respectively, of columns K2, K1, K0, respectively, by means of lines 17, 16, 15, respectively.

Next, all the 0 entries and all the 1 entries of a given column are coupled as separate inputs to column-associated 0-OR gates and 1-OR gates, respectively. As an example, the 0 entries of column K0 are coupled as separate inputs to 0-OR gate (K0/0) 18 by means of lines 20, 21, 22, 23 while the 1 entries of column K0 are coupled as separate inputs to 1-OR gate (K0/1) 24 by means of lines 25, 26, 27, 28.

Next, the outputs of the pair of column-associated OR gates, the 0-OR gate and the 1-OR gate that are associated with each column, are coupled as separate inputs to a column-associated AND gate. As an example, the outputs of 0-OR gate (K0/0) 18 and 1-OR gate (K0/1) 24 associated with column K0 are coupled as separate inputs to AND gate (K0) 30 by means of lines 32, 33.

Next, the output of the column-associated AND gates are coupled as separate inputs to a >1-OR gate for generating the >1 output signal indicating that two or more of the n decoder outputs are active. As an example, the outputs of AND gates (K0) 30, (K1) 34, (K2) 36 associated with columns K0, K1, K2, respectively, are coupled as separate inputs to > 1-OR gate 38 by means of lines 39, 40, 41, respectively.

Next, the outputs of any one pair of column-associated OR gates are coupled as separate inputs to a <1-OR gate for generating the <1 output signal indicating that none of the n decoder outputs is active. As an example, the outputs of the pair of OR gates (K0/0) 18, (K0/1) 24 that are associated with column K0 are coupled as separate inputs to <1-OR gate 40 by means of lines 42, 43, respectively.

Figure 3:
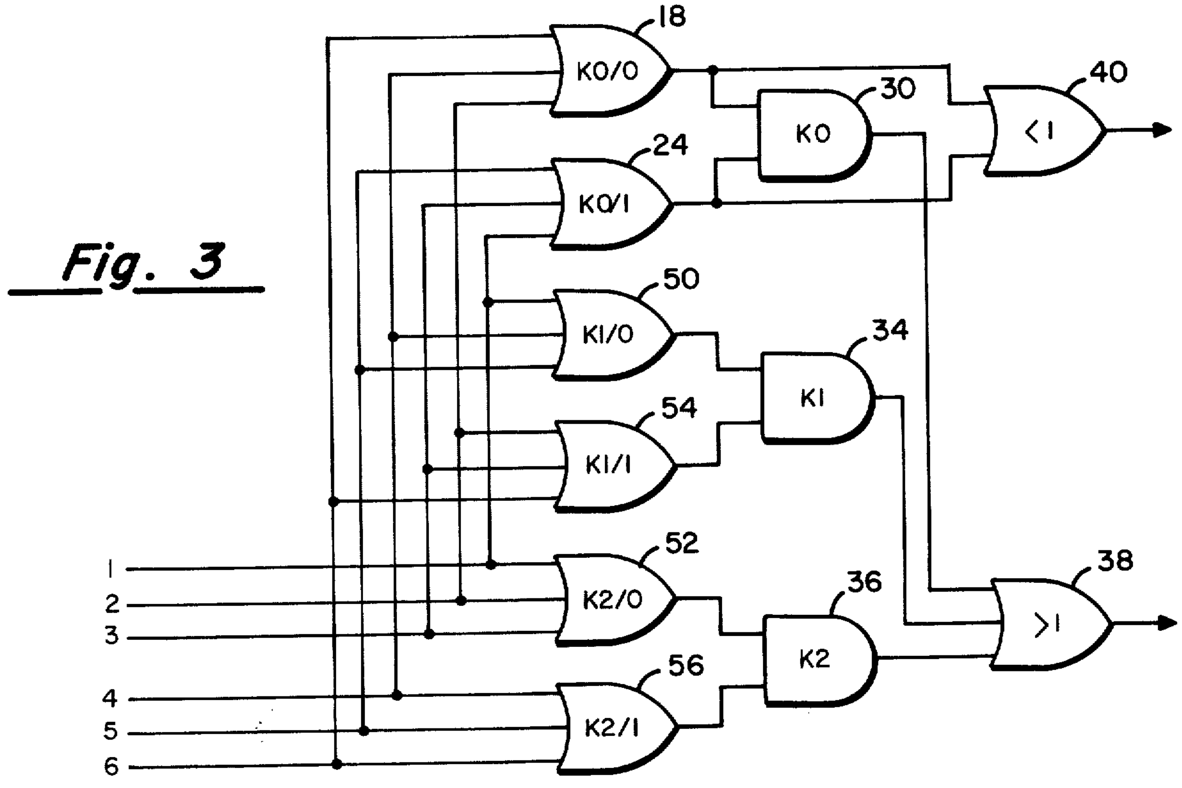
FIG. 3 is a circuit diagram of a 1-out-of-6 checking circuit obtained by a modification of the checking circuit of FIG. 2.

As a further example, Table A may be utilized to generate the 1-out-of-6 checking circuit of FIG. 3. For a 1-out-of-$m$, where $m<n$, checking circuit configuration, it is desirable that contiguous sets of entries from the substantial center of the table be selected. This procedure permits the use of OR gates having substantially the same number of inputs. Coupling the $m = 6$ outputs from the 1-out-of-6 decoder to rows $n$1 through $n$6 of Table A is accomplished in the same manner as illustrated in FIG. 1; however, with the deletion of the entries 0, 0, 0 of row n0 and of the entries 1, 1, 1 of row $n$7, the row associated lines 10 and 14 and their associated lines 11, 20; 12, 44; 13, 46 and lines 15, 28; 16, 45; 17, 47, respectively, are deleted, changing the 0-OR gates 18, 50, 52 and the 1-OR gates 24, 54, 56 to 3-input OR gates. Note that if instead of using rows n1 through n6 rows $n$0 through $n$5 have been used, 0-OR gates, 18, 50 and 1-OR gates 24, 52 would be 4-input OR gates while 0-OR gate 52 and 1-OR gate 56 would be 2-input OR gates. Thus, when designing a checking circuit for a 1-out-of-$m$ decoder where $m<n = 2^K$ a choice may be exercised to design a checking circuit with the desired number of different-input OR gates.

Figure 4:
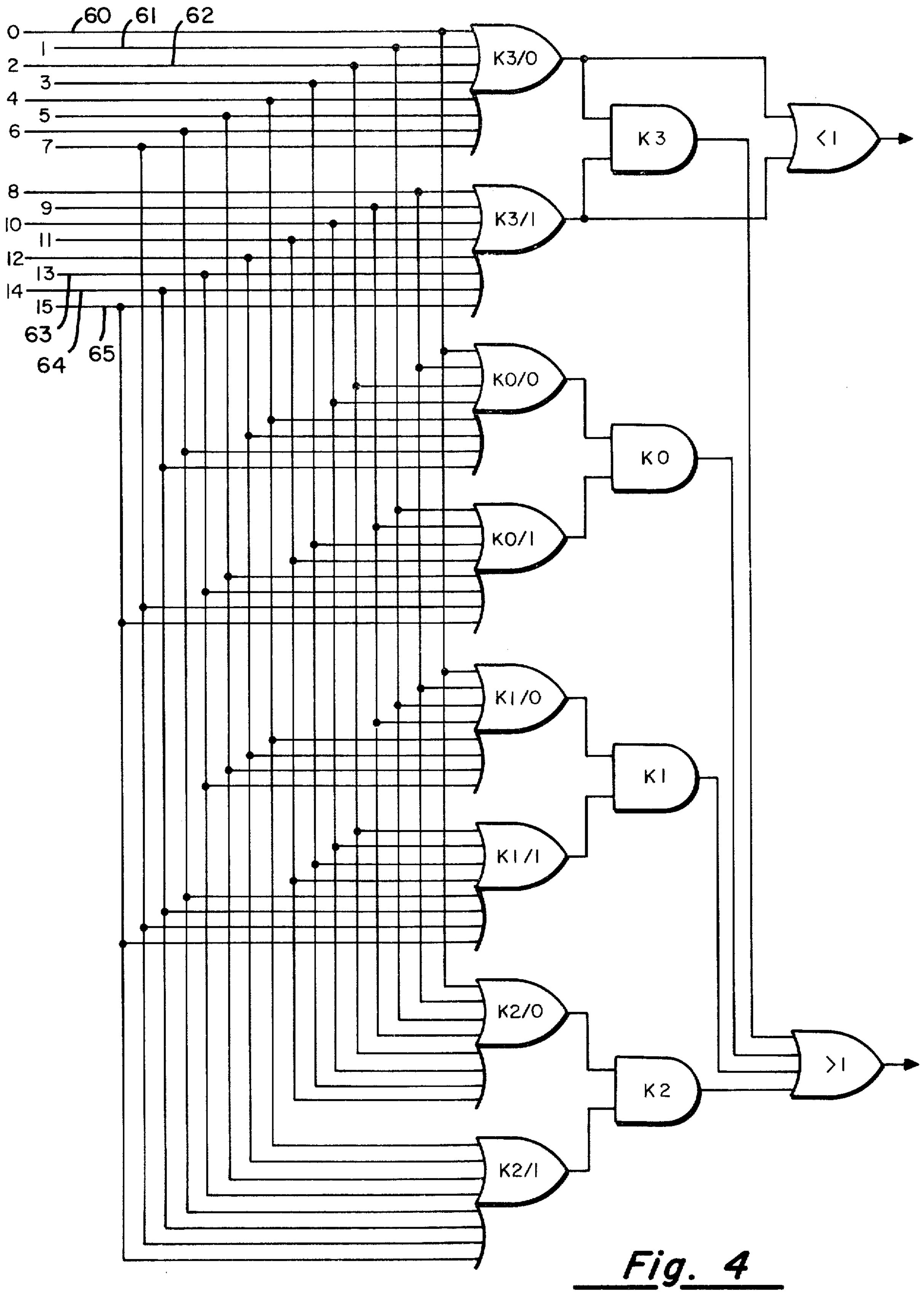
FIG. 4 is an illustration of a 1-out-of-16 checking circuit of the present invention.

With particular reference to FIG. 4 there is presented an illustration of a 1-out-of-16 checking circuit incorporating the present invention. The 1-out-of-16 checking circuit of FIG. 4 is generated using the binary table of Table B in which $n$, the number of outputs of the decoder to be checked, is 16, and, accordingly K = 4. Table B, is, accordingly, generated having $n$ rows, 0 through 15, and K columns, 0 through 3. In a manner similar to that noted in the discussion of FIGS. 1, 2 and Table A, knowing that $n = 16$ and $K = 4$ it is apparent that there will be 4 (K = 4) pairs of column-associated OR gates (K0/0, K0/1; K1/0, K1/1; K2/0, K2/1; K3/0, K3/1) and because $n = 2^K$, each of the column-associated OR gates will have 8-inputs. Further, it is apparent that there will be 4 column-associated AND gates (K0, K1, K2, K3) each of which will have as its 2 separate inputs the outputs of the same-column pair of column-associated OR gates (K0/0 . K/0/1 = K0). Additionally, the >1-OR gate will have as its 4 separate inputs the outputs of the 4 column-associated AND gates (K0 + K1 + K2 + K3 = >1) while the <1-OR gate will have as its 2 separate inputs the 2 separate outputs of the pair of OR gates associated with column K0 (K0/0 + K0/1 =<1); note that any pair of column-associated OR gates will perform the same<1 determination.

Figure 5:
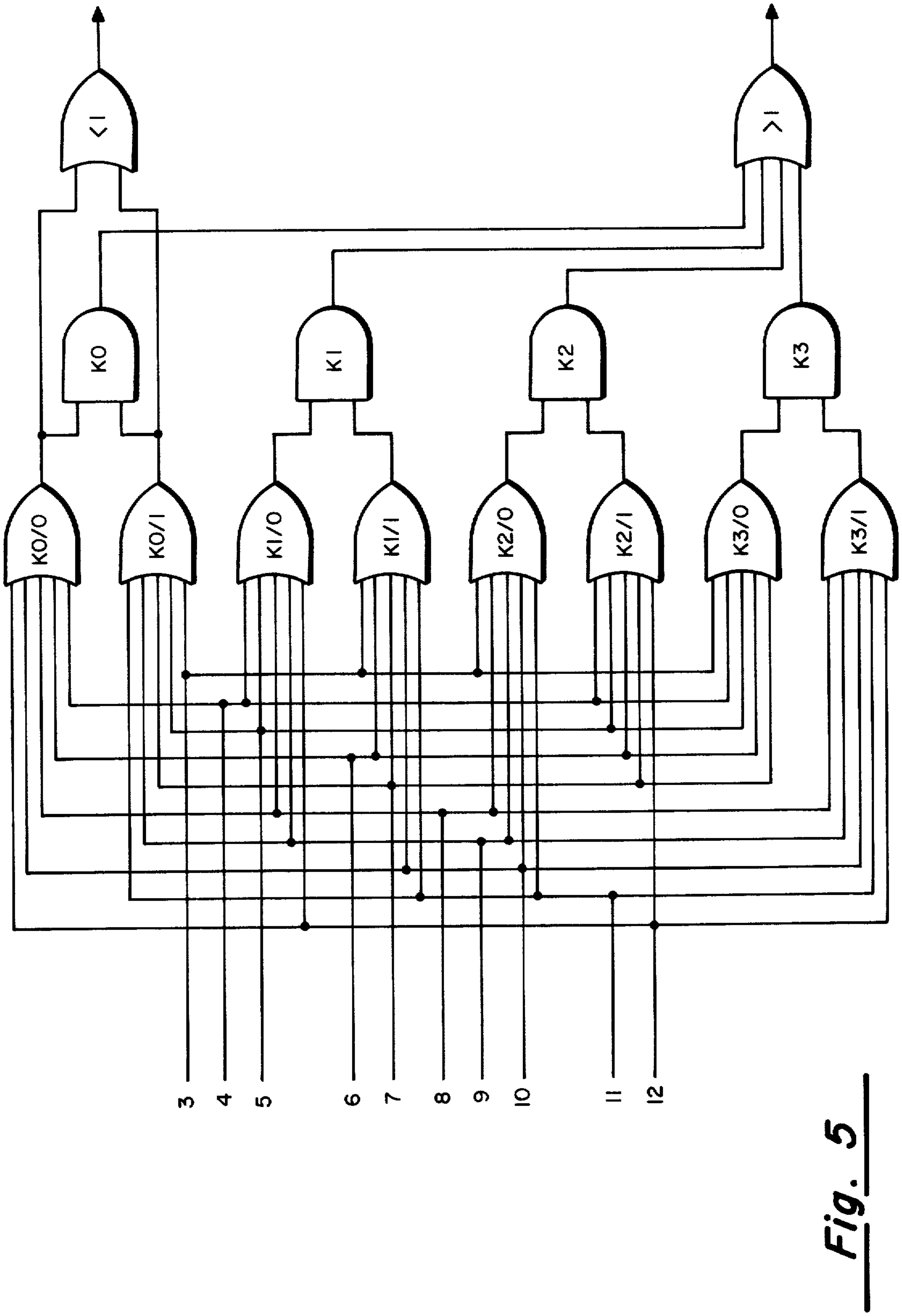
FIG. 5 is an illustration of a 1-out-of-10 checking circuit obtained by a modification of the checking circuit of FIG. 4.

As previously discussed with particular reference to FIGs. 1, 2 and Table A, Table B may be utilized to generate the 1-out-of-10 checking circuit of FIG. 5. As before, where $m<n$, it is desirable that contiguous sets of entries from the substantial center of the table be selected. Thus, with $m = 10$ the sets of entries of rows $n3$ through $n12$ are selected to ensure that all of the column-associated OR gates have the like number of separate inputs, e.g., 5. In a manner similar to that discussed with particular reference to FIG. 3 the lines associated with the non-selected rows $n0$, $n1$, $n2$, $n13$, $n14$, $n15$ are deleted from the 1-out-of-16 checking circuit of FIG. 14 to generate the 1-out-of-10 checking circuit of FIG. 5. That is, by the deletion of lines 60, 61, 62, 63, 64, 65 and their associated lines, the 8-input column-associated OR gates of FIG. 4 are converted to the 5-input column-associated OR gates of FIG. 5 whereby the 1-out-of-16 checking circuit of FIG. 4 is converted to the 1-out-of-10 checking circuit of FIG. 5.

Using the above described method as illustrated with particular reference to the $n = 2^K$ checking circuits of FIGS. 2 and 4 and the $m<n = 2^K$ checking circuits of FIGS. 3 and 5 it is apparent that the method of the present invention may be utilized to design a 1-out-of-$n(m)$ checking circuit where K is a positive integer of 2 or greater.

What is claimed is:

1. A checking circuit for a 1-out-of-$n$ binary decoder where $n = 2^K$, $n$ being the number of decoder outputs 0 through $n$-1 that are to be checked on the associated $n$ decoder output lines 0 through $n$-1 and $n$, K being positive integers wherein there is utilized for identification of the input lines associated therewith a binary table of $n$ rows, 0 through $n$-1, and K columns, 0 through K-1, with a binary 0 or 1 entry at each of the $n$K row-column intersections, said checking circuit comprising:

$n$K separate input lines, said $n$K separate input lines arranged into K sets of n column-associated input lines and $n$ sets of K row-associated input lines, each of said $n$K separate input lines associated with and identified by an associated one of said $n$K binary entries of said binary table for being identified either as a 0-associated input line or as a 1-associated input line as determined by the 0 or 1 binary entry at the associated one of said $n$K binary entries;

means parallel intercoupling the K input lines of each of said $n$ sets of K row-associated input lines for receiving the associated ones of said $n$ decoder outputs;

K pairs of column-associated OR gates, each pair comprised of a 0-associated OR gate and a 1-associated OR gate;

K column-associated AND gates;

a <1 OR gate;

a >1 OR gate;

means coupling the 0-associated input lines and the 1-associated input lines of each of said K sets of $n$ column-associated input lines to the 0-associated OR gate and the 1-associated OR gate, respectively, of the associated pair of the K pairs of column-associated OR gates;

means coupling the outputs of each pair of the K pairs of column-associated OR gates to an associated one of the K column-associated AND gates;

means coupling the outputs of the K column-associated AND gates to said >1 OR gate for generating the >1 output signal only when two or more of said n decoder outputs are active;

means coupling the outputs of any pair of the K pairs of column-associated OR gates to said <1 OR gate for generating the <1 output signal only when none of said n decoder outputs is active.

2. A checking circuit for a 1-out-of $m$ binary decoder where $m<n = 2^K$, $m$ being the number of decoder outputs 0 through $m$-1 that are to be checked on the associated $m$ decoder output lines 0 through $m$-1 and $m$, $n$, K being positive integers wherein there is utilized for identification of the input lines associated therewith a binary table of $n$ rows, 0 through $n$-1, and K columns, 0 through K-1, with a binary 0 or 1 entry at each of the nK row-column intersections, said checking circuit comprising:

$m$K separate input lines, said $m$K separate input lines arranged into K sets of $m$ column-associated input lines and $m$ contiguous sets of K row-associated input lines, each of said $m$K separate input lines associated with and identified by an associated one of the $m$K binary entries in the associated $m$ contiguous sets of K row-associated binary entries of said binary table for being identified either as a 0-associated input line or as a 1-associated input line as determined by the 0 or 1 binary entry at the associated one of said $m$K binary entries;

means parallel intercoupling the K input lines of each of said m sets of K row-associated input lines for receiving the associated ones of said n decoder outputs;

K pairs of column-associated OR gates, each pair comprised of a 0-associated OR gate and a 1-associated OR gate;

K column-associated AND gates;

a <1 OR gate;

a >1 OR gate;

means coupling the 0-associated input lines and the 1-associated input lines of each of said K sets of $m$ column-associated input lines to the 0-associated OR gate and the 1-associated OR gate, respectively, of the associated pair of the K pairs of column-associated OR gates;

means coupling the outputs of each pair of the K pairs of column-associated OR gates to an associated one of the K column-associated AND gates;

means coupling the outputs of the K column-associated AND gates to said >1 OR gate for generating the >1 output signal only when two or more of said m decoder outputs are active;

means coupling the outputs of any one pair of the K pairs of column-associated OR gates to said <1 OR gate for generating the <1 output signal only when none of said $m$ decoder outputs is active.

3. The checking circuit of claim 2 in which the number of input lines coupled to each of said column-associated 0-OR gates and said column-associated 1-OR gates is balanced by identifying the m contiguous sets of K row-associated input lines with the m contiguous sets of K row-associated binary entries with the substantial center of the n sets of K row-associated binary entries of said binary table.

* * * * *